United States Patent
Roelle

[11] Patent Number: 5,307,707
[45] Date of Patent: May 3, 1994

[54] MANUAL CABLE-SHEATH CONTROL

[76] Inventor: David R. Roelle, 42 Champion Pines, Conroe, Tex. 77303

[21] Appl. No.: 983,037

[22] Filed: Nov. 30, 1992

[51] Int. Cl.$^5$ ............................................. F16C 1/10
[52] U.S. Cl. .................................. 74/502.6; 74/502.4; 297/354.1
[58] Field of Search .................. 74/500.5, 501.6, 502, 74/502.4, 502.6, 506; 297/354, 84, 85, 68

[56] References Cited

U.S. PATENT DOCUMENTS

| | | | |
|---|---|---|---|
| 1,671,396 | 5/1928 | Ballentine et al. | 74/502.6 X |
| 3,730,019 | 5/1973 | Ballard | 74/502 |
| 4,007,647 | 2/1977 | Carlson | 74/502.4 |
| 4,198,873 | 4/1980 | Nagano et al. | 74/502.4 X |
| 4,580,822 | 4/1986 | Fukumoto | 292/336.3 |
| 4,690,454 | 9/1987 | Mizelle | 297/85 X |
| 5,003,837 | 4/1991 | Italiano | 74/500.5 X |
| 5,056,862 | 10/1991 | May et al. | 297/85 |
| 5,107,720 | 4/1992 | Hatfield | 74/502 |

FOREIGN PATENT DOCUMENTS

| | | | |
|---|---|---|---|
| 991087 | 10/1951 | France | 74/502.6 |
| 1173317 | 2/1959 | France | 74/501.6 |
| 586248 | of 0000 | United Kingdom | 74/502.6 |
| 6393 | of 1907 | United Kingdom | 74/502.6 |

Primary Examiner—Leslie A. Braun
Assistant Examiner—Ryan W. Massey

[57] ABSTRACT

The improved manual sheath-cable control includes a sheath, a cable extending through the sheath, the sheath having connectors on both ends, the cable extending through the sheath end connectors and having end connectors, an actuator having a housing and a lever pivotally mounted within the housing, means on the lever for receiving one end of the cable, a slot in the housing, the housing end sheath connector being rotationally positioned within the housing slot, the housing end sheath connector having a cable passage therethrough which passage bends at an angle, such angle of bend to the cable passage is sufficient to provide alternate positioning of the sheath-cable extending from the actuator housing without interfering with the operation of the control.

6 Claims, 4 Drawing Sheets

MANUAL CABLE-SHEATH CONTROL

BACKGROUND

The improved manual control of the present invention can be used as a control for cars, such as for releasing the latch holding a door closed or for releasing the latch holding the hood closed, for lawn mowers, airplanes wherein a sheath and cable structure is required to perform a remote function and for motion furniture to allow a person sitting in the furniture to control the position of the furniture or to lock it into its upright position.

Prior to the present invention cable-sheath structures have been used in many applications and have normally included a cable extending through and out each end of its sheath with connecting means on each end of the sheath and on each end of the cable. Normally one of the connecting means is connected to the housing or frame structure in which the manual actuator is positioned, and the actuator includes an actuator lever structure pivotally mounted to the housing with the end of the cable connected to the actuator lever so that manual movement of the lever causes sliding movement of the cable in the sheath and allows the desired action by the connection of the opposite end to the component which is to be controlled by the sliding movement of the cable.

U.S. Pat. Nos. 5,056,862 and 5,107,720 disclose the aforementioned control structures. An additional control structure used with motion furniture is disclosed in my copending application Ser. No. 07/983,126filed concurrently herewith. In each of these cable-sheath manual controls, the cable extends in an almost straight line as it approaches the actuator housing, as it passes through the housing connecting means on the end of the sheath which connects to the actuator housing and as it extends through the housing to its connection to the actuator lever. Any change in direction of the cable and sheath are in generally long radius bends and they are at a distance from the actuator housing.

An additional control structure which is used for automobile doors is disclosed in U.S. Pat. No. 4,580,822. This patent discloses a similar operating structure but uses a control rod rather than the cable and sheath structure.

SUMMARY

The improved manual sheath cable control of the present invention includes a sheath, a cable extending through and out of each end of the sheath, connecting means on each end of the cable, connecting means on each end of the sheath, an actuator including a housing and an actuator lever, means on the housing for receiving the connecting means on the sheath, means on the actuator lever for receiving the connecting means on the cable, means for pivotally mounting the actuator lever to the housing, said connecting means for the housing end of the sheath including a bend therein immediately outside the portion thereof received by the housing and preferably is pivotally mounted in the housing.

An object of the present invention is to provide an improved manual control of the sheath-cable type having greater utility to be used in multiple positions independent of the position of the housing.

A further object is to provide an improved manual control of the sheath and cable type in which the cable as it approaches its entry into the actuator housing has a substantial bend to allow for flexibility of orientation of installation of the actuator.

BRIEF DESCRIPTION OF THE DRAWINGS

These and other objects and advantages of the present invention are hereinafter set forth and explained in reference to the drawings wherein.

DESCRIPTION OF THE PREFERRED EMBODIMENT

Figure 1:
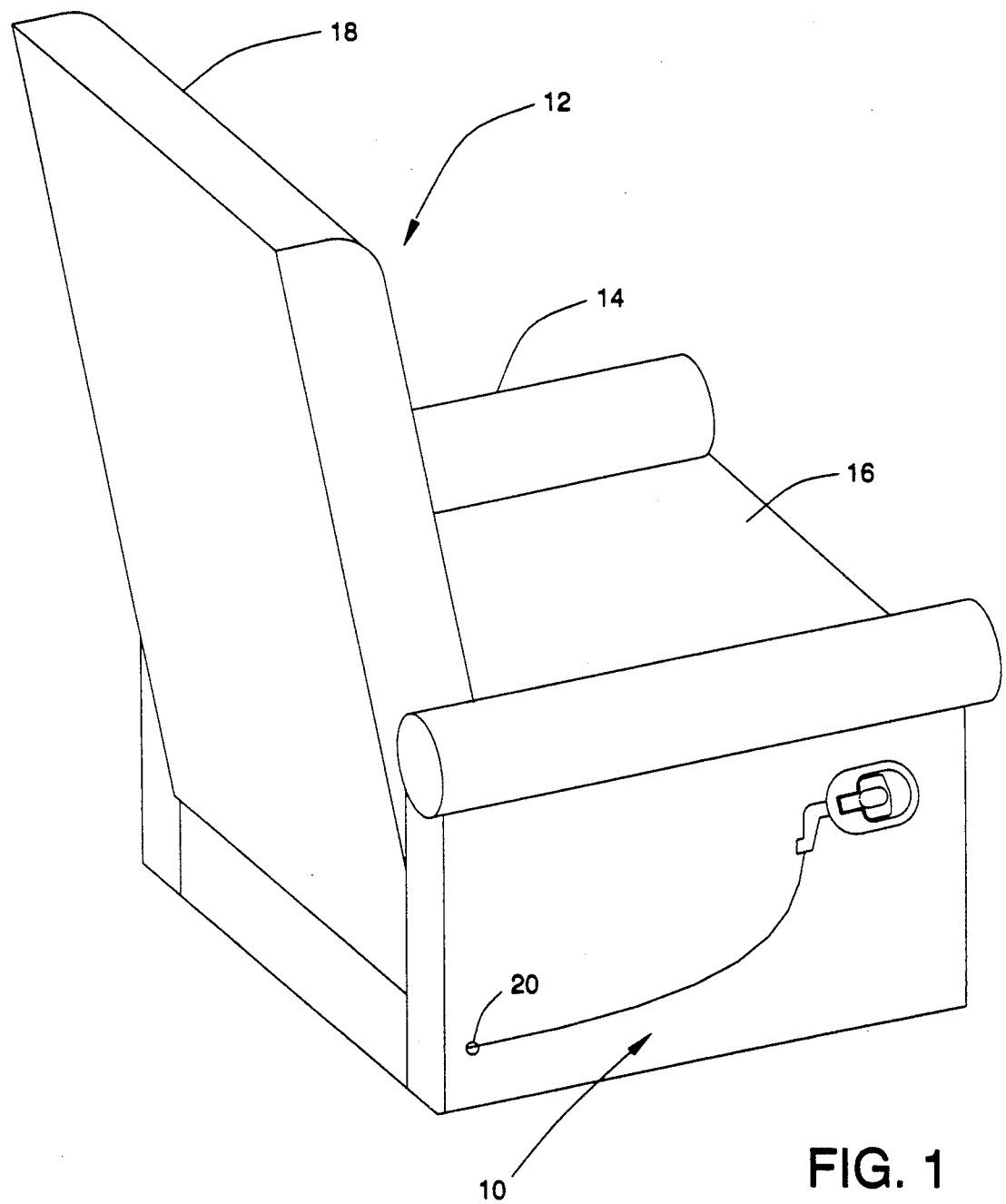
FIG. 1 is a perspective view of the use of the improved control of the present invention in motion furniture.

As shown in FIG. 1, the improved control 10 of the present invention is shown mounted in the side of motion furniture 12 below arms 14. Furniture 12 includes seat element 16 and back element 18, both of which move when latching mechanism 20 which retains them in their normal position, is released by actuation of control 10 as hereinafter described. This release allows back element 18 to tilt to the rear and seat element 16 to move forward.

Control 10 is a sheath 22 and cable 24 type of structure including actuator 26 having housing 28 and operating lever 30. Sheath 22 includes connecting means 32 on each end and has cable 24 extending therethrough and beyond such connecting means 32. One of said connecting means or connector 32a is provided to connect to latching mechanism 20 or whatever mechanism is to be operated by control 10 and the other connecting means or connector 32b is connected to housing 28. Cable 24 includes connecting means 34 on each end thereof, one end to connect to latching means 20 (not shown in detail but of any suitable design of mechanism) and the other end to connect to actuator lever 30 within housing 28. Pin 36 extends through housing 28 and lever 30 to pivotally mount lever 30 within housing 28. Lever 30 includes arcuate groove 38 with recess 40 at its inner end as shown to receive cable connecting means 34. Projections 42 are positioned above the inner portion of groove 38 as shown to allow cable 24 to pass therethrough but act as a means of retaining cable 24 within groove 38. When lever 30 is raised to its position as shown in FIG. 2 it will pull cable 24 through sheath 22 and into housing 28 to cause means 20 to be actuated.

Figure 3:
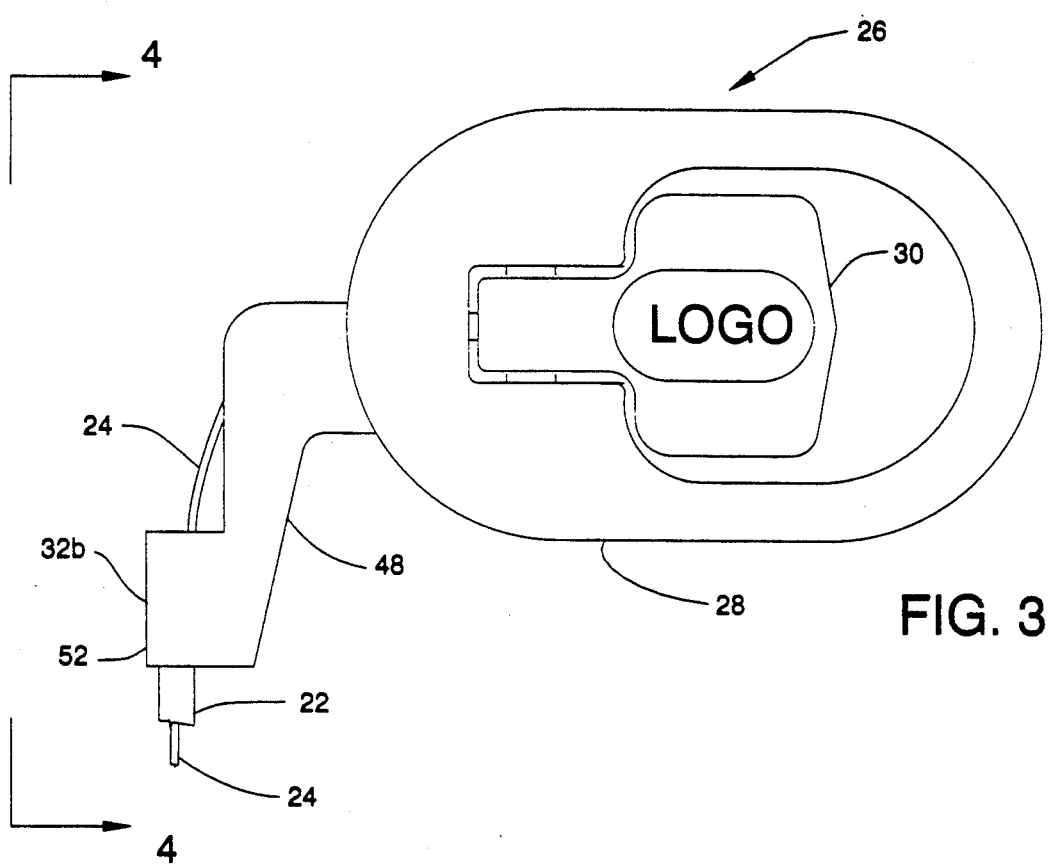
FIG. 3 is a plan view of the improved sheath-cable control to illustrate another position of the cable and sheath extending from the actuator housing.
Figure 4:
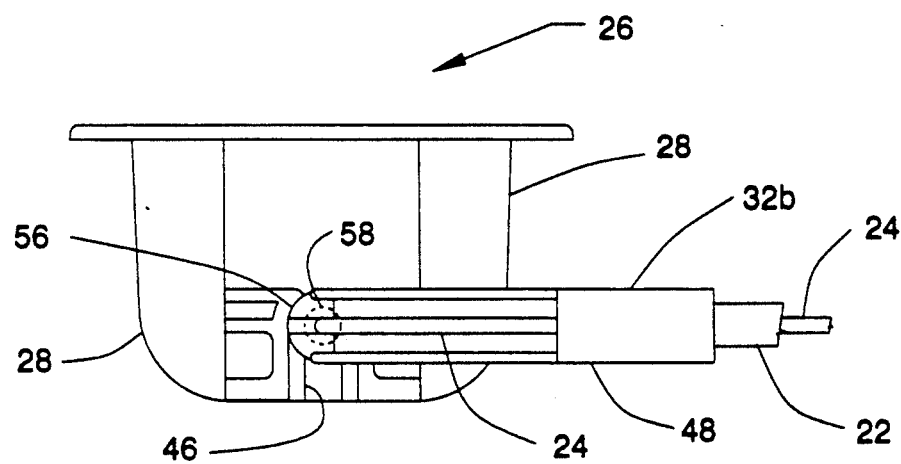
FIG. 4 is an end view taken in FIG. 3 along line 4—4 to illustrate details of the connection of the sheath engaging and pivoting in the actuator housing.

Sheath connector 32b is of a different structure than has previously be used for sheath connecting means prior to the present invention. Connector 32b as best illustrated in FIGS. 2, 3 and 4 includes a first flanged end 44 which is received within a slot 46 in housing 28, a body 48 which extend generally at 90° to flanged end 44 and cable passage 50 through end 52 with arcuate cable groove 54 and guide cable from passage 50 around arcuate grove 54 and through flanged end 44. It should be noted that another suitable means for installing sheath connecting means to the housing 28 utilize a plurality of fingers extending through a circular opening in the housing and having outward extensions on their ends to engage the interior of the housing to prevent inadvertent removal form the opening while allowing the connecting means to pivot with respect to the opening in which it is installed.

Figure 2:
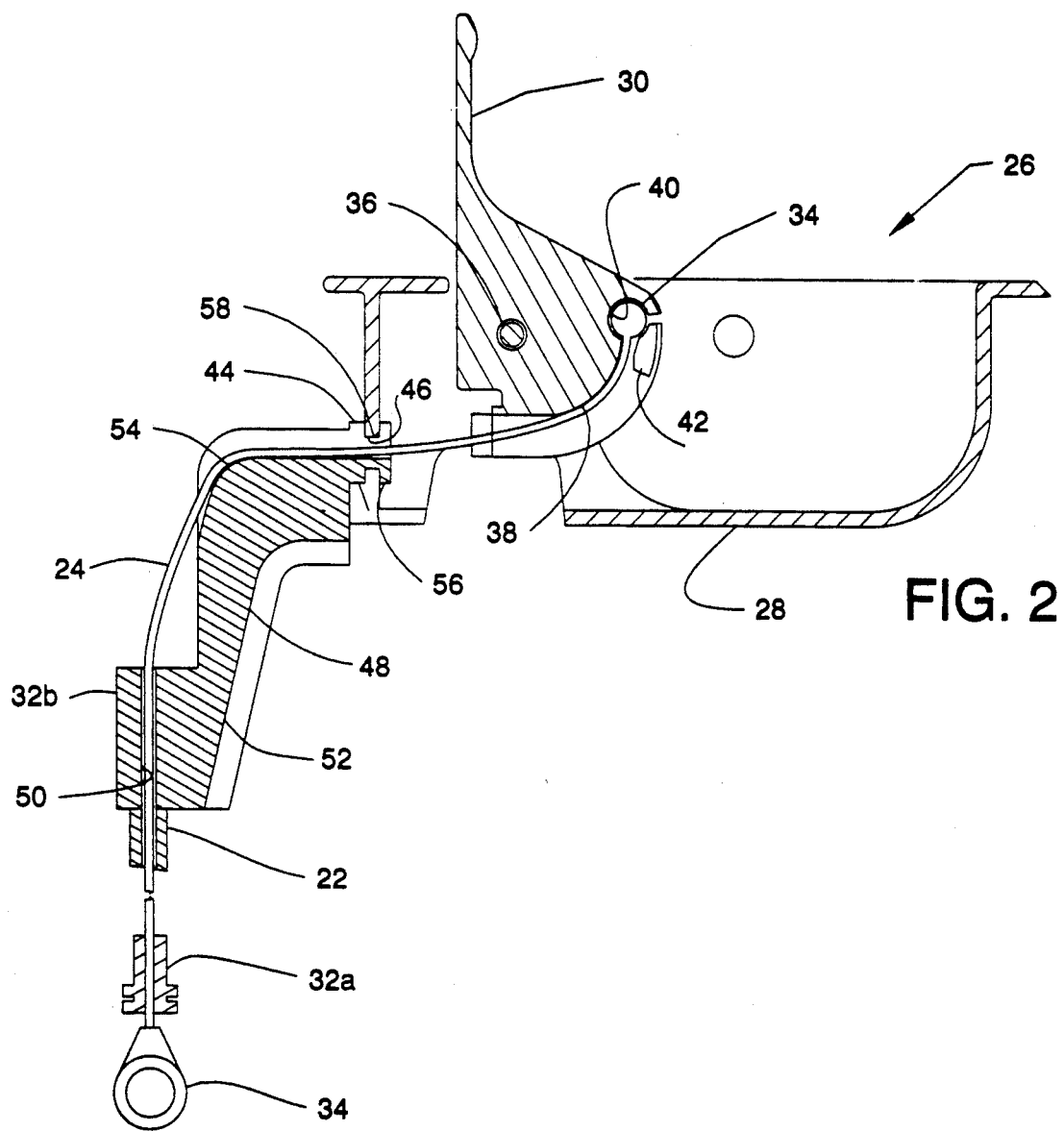
FIG. 2 is a sectional view of the control actuator to show the position of the cable and sheath extending from the actuator housing.

As best seen in FIGS. 2 and 4, flanged end 44 of connector 32b includes a pair of annular flanges 56 with annular groove 58 between flanges 56. Groove 58 is positioned in the closed end of slot 46 and must pass through the restriction in slot 46 which is positioned between the open end of slot 46 and the closed end of slot 46. Thus, when connector 32b has been installed as shown, it is able to be rotated 360° with respect to housing 28 providing a much greater flexibility of positioning of the cable-sheath structure than by the long radius bends required of the prior art. With this structure the sheathed cable can extend in any suitable direction to allow a great flexibility of positioning in a motion chair or in a car. While angle of connector 32b is shown to be approximate 90°, it should be noted that connector 32b could be easily made to have a different angle if such angle were desired. This change of position of the sheath-cable leading away from actuator 26 can be seen with respect to FIGS. 2 and 3, wherein in FIG. 2 the sheath-cable leading away from control 26 is at an approximate right angle with respect to the top of housing 28 and in FIG. 3 its angle is approximately 90° but in a plane generally parallel to the top of housing 28. This provides an advantage not available from the prior art structures in that the same control structure can be used in more than one position. For example, a control for a reclining chair could be place int he side as shown in FIG. 1, could be placed in the top of the arm or could even be laced in the inside or font of the arm. This provides a much greater flexibility for the manufacturer of the motion furniture in selection of a convenient position for the actuator depending on the configuration and size of the furniture. It has been found that the function and operation of the control system is not in any way negatively affected by the improved sheath connector.

What is claimed is:

1. A manual control comprising
   a sheath having a central opening extending axially therethrough and having sheath housing connecting mean son each end thereof,
   a cable extending through and beyond said sheath and said sheath housing connecting means and having cable connecting means on each end thereof, and
   an actuator having a housing and actuating lever, and
   means for pivotally mounting said actuating lever to said housing,
   said actuator housing having means for receiving one of said sheath housing connecting men son said sheath,
   said actuating lever having means of receiving the one of said cable connecting means extending beyond the sheath housing connecting means received by said actuator housing,
   said sheath housing connecting means providing a passage therethrough for said cable and said cable passage having a bend within said sheath housing connecting means.

2. A manual control according to claim 1 wherein said bend in said passage is approximately a right angle.

3. A manual control according to claim 1 wherein said sheath housing connecting means is rotationally mounted to said housing.

4. A manual control according to claim 3 includes
   said sheath housing connecting means having a body, a housing connecting end and a sheath connecting end,
   said sheath housing connecting end being formed to be pivotally positioned in a slot in the housing whereby said sheath housing connecting means is rotational with respect to said housing.

5. A manual control according to claim 4 wherein said sheath housing connecting means includes
   a cable passage through said sheath connecting end,
   a cable passage through said housing connecting end, and
   an arcuate groove for receiving the cable extending between said cable passage in said sheath connecting end and said cable passage in said housing connecting end.

6. A manual control system comprising
   a housing,
   a lever,
   means for pivotally mounting the lever within the housing,
   means for connecting a sheath to said housing, and
   means for connecting the end of a cable extending into the housing through the sheath-housing connecting means to said lever,
   said sheath-housing connecting means having a bend therein so that the axis of the cable and sheath approaching the housing is at an angle with respect to the axis of the sheath and cable entering said housing.

* * * * *